(12) United States Patent
Richter et al.

(10) Patent No.: US 9,535,888 B2
(45) Date of Patent: Jan. 3, 2017

(54) SYSTEM, METHOD, SOFTWARE ARRANGEMENT AND COMPUTER-ACCESSIBLE MEDIUM FOR A GENERATOR THAT AUTOMATICALLY IDENTIFIES REGIONS OF INTEREST IN ELECTRONIC DOCUMENTS FOR TRANSCODING

(71) Applicant: bMenu AS, Oslo (NO)

(72) Inventors: Thomas Richter, Berlin (DE); Giovanni Scerra, Jersey City, NJ (US); Marco Donizelli, Oslo (NO); Bjørn Holte, Brooklyn, NY (US)

(73) Assignee: Bmenu AS, Oslo (NO)

( * ) Notice: Subject to any disclaimer, the term of this patent is extended or adjusted under 35 U.S.C. 154(b) by 741 days.

(21) Appl. No.: 13/841,073

(22) Filed: Mar. 15, 2013

(65) Prior Publication Data

US 2013/0262983 A1    Oct. 3, 2013

Related U.S. Application Data

(60) Provisional application No. 61/617,823, filed on Mar. 30, 2012.

(51) Int. Cl.
*G06F 17/22* (2006.01)
*G06F 17/30* (2006.01)

(52) U.S. Cl.
CPC ......... *G06F 17/2247* (2013.01); *G06F 17/227* (2013.01); *G06F 17/30905* (2013.01)

(58) Field of Classification Search
CPC ............ G06F 17/30905; G06F 17/2247
See application file for complete search history.

(56) References Cited

U.S. PATENT DOCUMENTS

| | | | | |
|---|---|---|---|---|
| 5,619,709 | A  * | 4/1997  | Caid ............... | G06F 17/30265 704/9 |
| 6,880,122 | B1 * | 4/2005  | Lee ............... | G06K 9/2054 382/176 |
| 7,343,365 | B2 * | 3/2008  | Farnham ....... | G06F 3/0481 707/737 |
| 7,415,445 | B2   | 8/2008  | Forman | |
| 7,680,833 | B1 * | 3/2010  | Cole ............. | G06F 17/30575 707/999.201 |
| 7,840,569 | B2 * | 11/2010 | Meyerzon ...... | G06F 17/30864 706/62 |
| 7,900,050 | B2 * | 3/2011  | Izu ............... | G06F 21/645 380/28 |

(Continued)

OTHER PUBLICATIONS

International Search Report for International Patent Application No. PCT/US2013/032407 mailed on Jun. 7, 2013.

(Continued)

*Primary Examiner* — Scott Baderman
*Assistant Examiner* — Mario M Velez-Lopez
(74) *Attorney, Agent, or Firm* — Andrews Kurth Kenyon LLP

(57) ABSTRACT

A system, method and computer-accessible medium for analyzing an electronic document(s) can be provided. For example, content data can be received that can be related to the electronic document(s). The content data can be segmented into a plurality of first segments, and then combined into a second segment(s). Ranking information can be generated for the second segment(s).

26 Claims, 8 Drawing Sheets

(56) References Cited

U.S. PATENT DOCUMENTS

| | | | | |
|---|---|---|---|---|
| 8,019,988 B2* | 9/2011 | Li | | H04L 63/0428 |
| | | | | 713/150 |
| 8,185,635 B2* | 5/2012 | Holmes | | H04L 12/581 |
| | | | | 370/352 |
| 8,291,229 B2* | 10/2012 | Vuillaume | | G06F 21/33 |
| | | | | 380/28 |
| 8,316,315 B2* | 11/2012 | Portnoy | | G06Q 10/107 |
| | | | | 715/764 |
| 8,352,737 B2* | 1/2013 | Solis | | H04L 9/3236 |
| | | | | 707/693 |
| 8,619,780 B1* | 12/2013 | Brandwine | | H04L 45/02 |
| | | | | 370/392 |
| 8,650,473 B2* | 2/2014 | Fukasawa | | G06T 11/60 |
| | | | | 715/209 |
| 8,688,461 B1* | 4/2014 | Richards | | G06Q 50/18 |
| | | | | 705/1.1 |
| 8,812,493 B2* | 8/2014 | Tankovich | | G06F 17/30864 |
| | | | | 707/722 |
| 9,348,920 B1* | 5/2016 | Kesin | | G06F 17/30554 |
| 2002/0015042 A1* | 2/2002 | Robotham | | G06F 3/14 |
| | | | | 345/581 |
| 2002/0069190 A1* | 6/2002 | Geiselhart | | G06F 17/30648 |
| 2002/0129006 A1* | 9/2002 | Emmett | | G06F 17/30896 |
| 2003/0050909 A1* | 3/2003 | Preda | | G06F 17/30864 |
| 2004/0003028 A1* | 1/2004 | Emmett | | G06F 17/30905 |
| | | | | 709/203 |
| 2005/0028077 A1* | 2/2005 | Wen | | G06F 17/218 |
| | | | | 715/272 |
| 2005/0091261 A1* | 4/2005 | Wu | | G06F 21/64 |
| 2006/0259857 A1* | 11/2006 | Atkins | | G06T 11/60 |
| | | | | 715/235 |
| 2006/0282758 A1* | 12/2006 | Simons | | G06F 17/30905 |
| | | | | 715/210 |
| 2008/0288476 A1* | 11/2008 | Kim | | G06F 17/30905 |
| 2009/0157657 A1 | 6/2009 | Kim et al. | | |
| 2013/0262983 A1* | 10/2013 | Richter | | G06F 17/2247 |
| | | | | 715/234 |

OTHER PUBLICATIONS

International Written Opinion for International Patent Application No. PCT/US2013/032407 mailed on Jun. 7, 2013.

* cited by examiner

SYSTEM, METHOD, SOFTWARE ARRANGEMENT AND COMPUTER-ACCESSIBLE MEDIUM FOR A GENERATOR THAT AUTOMATICALLY IDENTIFIES REGIONS OF INTEREST IN ELECTRONIC DOCUMENTS FOR TRANSCODING

CROSS-REFERENCE TO RELATED APPLICATIONS

This application relates to and claims priority from U.S. Patent Application No. 61/617,823, filed on Mar. 30, 2012, the entire disclosure of which is incorporated herein by reference.

FIELD OF THE PRESENT DISCLOSURE

The present disclosure relates generally to electronic document analysis and transcoding and more specifically to exemplary embodiments of system, method, software arrangement and computer-accessible medium which automatically analyze an electronic document, picks one or more language expressions known as regions of interest based on the analysis, and automatically converts the electronic document into a modified version of the electronic document using the regions of interest.

BACKGROUND INFORMATION

The Internet provides users access to a multitude of websites. These websites can be made up of web pages, which can be linked together using a hypertext markup language ("HTML") code. Websites can also include links or access to other electronic documents, including but not limited to, spreadsheets, pdfs, word processing documents and post-script documents. While many of these electronic documents, including web pages, can be optimally viewed on large-screen devices such as desktops, televisions and laptops, they may not be optimally viewed on small-screen devices, such as personal digital assistants ("PDAs") and mobile phones, due to their different display capabilities, such as different total pixel count, pixels per inch and the graphics capabilities of the device itself or its screen. This can make reading or navigating between the electronic documents more complex and demanding than on a large-screen device. These challenges are particularly apparent in the context of websites. Indeed, the demand for efficient access to websites on small-screen devices has been increasing. Therefore various technological advancements arose to optimize small-screen viewing of websites. However, these approaches to create small-screen versions of websites have several disadvantages.

Some of the existing approaches for providing or facilitating small-screen versions of websites and examples of their disadvantages are described below:

One such approach for creating small-screen versions of websites can be automatic transcoding. Automatic transcoding creates small-screen versions of web pages through an automated proxy. While this process streamlines the creation of small-screen versions of web pages, the results exhibit one or many of the following shortfalls: the whole content of the page can be transcoded, so the page becomes very long, and unnecessary content can be shown; the menu items are not optimized; the reference to which elements should be displayed and which should not can be lost; the positioning relationship of elements in 2 dimensional (x,y) or 3 dimensional space (x,y and in front of each other) can be lost; the loss of positioning can also lead to an order that does not correspond to the reading order of the original document; and styling can be partially or fully lost. Additionally, since automatic transcoding generally removes client-side scripts, the resulting web page may not contain the same functionality as the original web page. Moreover, there can be no way to optimize the small-screen pages to work well with individual small-screen devices, such as personal digital assistants ("PDAs") and mobile phones. Since automatic transcoding does not allow users to customize the web pages, there are often major flaws in the small-screen versions of the web pages.

In order to improve on the lack of customization that results from using automatic transcoding, another system and method has been suggested to provide content authors with a means to control how the resulting content can look. This "selective transcoding" provides content authors the ability to more easily control the style and content of the small-screen web pages. It has been suggested that this method and system allows for the creation of small-screen web pages that more closely match the original web pages.

However, the above-described prior method and system have disadvantages of its own. By giving too many of the decision-making responsibilities to a content author, and taking them away from an automatic system, the transcoding process becomes more time-consuming and requires repetitive user input, and can lead to sub-optimal viewing experiences in case of user error. Furthermore, the method only removes the document length shortfall and some of the positioning and display shortfalls.

Another approach for improving automatic transcoding involves extensible transcoder annotations (XTAs) that provide rules to the transcoder to improve how the web pages are transcoded. The transcoder executes the XTA instructions. A person can remotely edit the XTAs. Just like the approach above however, this approach also potentially improves the transcoding results, but at the expense of additional manual work. Furthermore, XTAs only address the document length and display shortfalls and some of the positioning shortfalls.

Exemplary embodiments of automatic system and method for analyzing electronic documents to optimize such documents for transcoding can therefore be preferable to make the transcoder function and perform in an improved manner, with no or minimal manual effort.

The above described problem areas are merely representative. Other areas can exist where the exemplary embodiments of automatic system, method, software arrangement and computer-accessible medium for analyzing and transcoding electronic documents can be advantageous.

Thus, there may be a need to provide exemplary embodiments of automatic system, method, software arrangement and computer-accessible medium for, e.g., analyzing and processing electronic document code to optimize it for transcoding, selecting one or more regions of interest using the results, and thereafter automatically transcoding websites, which can improve access to the specific content and web pages within these sites for specific small-screen devices. Furthermore, as mentioned herein, retaining all or some of the styling information, including visibility settings and positioning, removes some of the shortfalls of transcoding.

SUMMARY OF EXEMPLARY EMBODIMENTS

Exemplary embodiments of the present disclosure provide certain exemplary solutions to the problems of the techniques described above.

According to certain exemplary embodiments of the present disclosure, exemplary embodiments of the system, method, software arrangement and computer-accessible medium can be provided for analyzing electronic documents by identifying a variety of the electronic documents' properties, selecting the document properties, developing one or more machine readable descriptions of how the properties of the documents can be located in the electronic documents, referred herein as regions of interest, providing the regions of interest to a transcoder, and modifying the electronic document via the transcoder using the regions of interest.

Representative and/or exemplary electronic documents can include but not limited to, e.g., any type of document that can have a clear definition on how to store and how to display, and hence can be transcoded, including but not limited to web pages and electronic forms. In one exemplary embodiment, the analysis of electronic documents comprises a logical block identifier known as an identifying strategy that generates a representation of the electronic document in logical blocks, and a logical block ranker known as a ranking strategy, which goes through the blocks identified and ranks them in relation to one another. In another exemplary embodiment, the blocks are scored via the ranking strategy. The numbers represent the probability that the electronic document blocks contain certain functional element types, including but not limited to content and menu. In typical embodiments, the blocks picked as representing the menu and the blocks picked as representing the content are each defined in machine-readable descriptions, known as regions of interest, that specify the locations of the portions of the electronic document code that are to be transcoded. However, any conceivable functional type can each have their own regions of interest. In another exemplary embodiment of the present disclosure, a styling recipe complements the regions of interest.

To address such exemplary need, exemplary embodiments of methods, systems, software arrangements, and computer-accessible media can be provided for automatically analyzing electronic documents in general, and web pages specifically, to optimize them for transcoding, and thereafter subsequently transcoding them.

For example, according to certain exemplary embodiments of the present disclosure, it can be possible to perform the following:
a) utilize a rendering engine that can determine layout according to HTML/CSS layout rules;
b) divide the page into individual blocks;
  (1) either by using HTML, XML, or XML-like opening and closing identifiers or tags, such as "<div>"
  (2) or by using the data element starting and ending identifications in binary file structures
  (3) or by using grouping based on elements belonging together by layout and the page reading flow, an identification strategy that identifies blocks by utilizing one or more search directions, which are determined by the cultural, language and layout specific attributes of the analyzed document;
c) rank blocks according to functional element types, by using the;
  (1) block's position
  (2) proportion of linkext
  (3) proportion of innertext and/or
  (4) block's size compared to the total size of the page
d) categorize and choosing blocks based on score;
e) record the results in a data store;
f) generate style definitions for each block and elements in each block; and
g) on end-user machine request of the webpage, convert and render the web page on an end-user machine based on the stored information on the blocks.

These and other objects of the present disclosure can be achieved by provision of a system, method and computer-accessible medium for analyzing an electronic document(s) that can, for example, receive content data that can be related to the electronic document(s). The content data can be segmented into a plurality of first segments, and then combined into a second segment(s). Ranking information can be generated for the second segment(s), and the second segment(s) can be transcoded based on the ranking information. The second segment(s) can include a plurality of second segments, and the raking information can be generated for all of the second segments. Each of the second segments can be transcoded based on the rank information for each of the second segments.

In some exemplary embodiments of the present disclosure, the segmenting of the content data can be based on predefined segments which can be native to the content data of the electronic document(s). Each of the first segments can be categorized based on a predetermined function(s) or particular information(s) associated with each of the first segments. The particular information(s) can include content blocks or menu blocks. A description of the second segment(s) can be generated, which can correspond to a pattern-matching rule(s) that can identify one or more block elements of the electronic document(s). The electronic document(s) can include a web page, which can be hosted on a server. The content data can include a HTML.

In certain exemplary embodiments of the present disclosure, the content data can be segmented by dividing the electronic document(s) into the first segments based on mark-up structure wrapping elements inside an open and a closing information or elements in a binary file structure that identify a beginning and an end of existing data element(s) of the electronic document(s). The content data can be segmented by identifying adjacent ones of the first segments using a search direction(s), and combining first segments with an adjacent one of the first segments. The search direction(s) can be determined by (i) cultural specific attributes of the electronic document(s), (ii) language specific attributes of the electronic document(s), or (iii) layout specific attributes of the electronic document(s).

In certain exemplary embodiments of the present disclosure, the ranking information can be determined by a computing score based on a rule(s) for establishing whether the second segment(s) is a candidate for performing a function(s) inside the electronic document(s). The computing score can be based on an evaluation of native code properties of the first segments or a visual property(s) of the first segments. The computing score(s) can be adjusted based on a heat map associated with the electronic document(s). The computing score can be adjusted based on an artificial intelligence procedure.

In certain exemplary embodiments of the present disclosure, a style definition(s) can be generated for the electronic document(s). The style definition(s) can use HTML compliant styling syntax. The transcoded second segment(s) can be prepared and adapted to be displayed on an end-user display device, which can be a mobile device. In certain exemplary embodiments of the present disclosure, the second segment(s) can be different than the first segments.

These and other objects, features and advantages of the present disclosure will become apparent upon reading the following detailed description of embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

The exemplary embodiments of the system, method, software arrangement and computer-accessible medium according to the present disclosure, referred to herein as "bMobilized" without any limiting effect, can be implemented using the following exemplary techniques, procedures and arrangements.

In the following description and/or claims, the terms "coupled" and/or "connected" can be used, but are certainly not limited to, to indicate not only that two or more elements can be "directly or physically connected" to each other, but also that two or more elements can be "electrically connected" to each other where intervening elements can be present. Further, in the following description and claims, the terms "includes", "has" "with" or "comprises" are intended not to exclude other components but to further include other components unless otherwise indicated.

According to certain exemplary embodiments of the present disclosure, system, method, software arrangement and computer-accessible medium can be provided for analyzing electronic documents by identifying a variety of the electronic documents' properties, selecting the document properties, developing one or more machine readable descriptions of how the documents' properties can be located in the electronic documents, herein referred to as regions of interest, providing the regions of interest to a transcoder, and modifying the electronic document via the transcoder using the regions of interest.

An exemplary region of interest can include, but is not limited to, a pattern matching rule that identifies one or more elements of an electronic document. In other words, it describes the regions of the electronic document from which code, including but not limited to HTML, are fetched for conversion. These patterns, similar to regular expressions or CSS selectors, can range from simple element names to rich contextual patterns. If all conditions in a certain region of interest are true for a certain element, then the region of interest matches the element. The syntax of a region of interest expression can vary depending on the electronic document native code (e.g. HTML, PDF, etc.). Examples of regions of interest for HTML can be: 1)+div [ ]; 2)*div [ ]; and 3) −div [ ]. The regions of interest can be matched with attributes and values to supply extra information about the element's content. For example, +div [id=content] can include the first div with content on the page, and −table [ipos=0] can remove the first table on the page.

Figure 1:
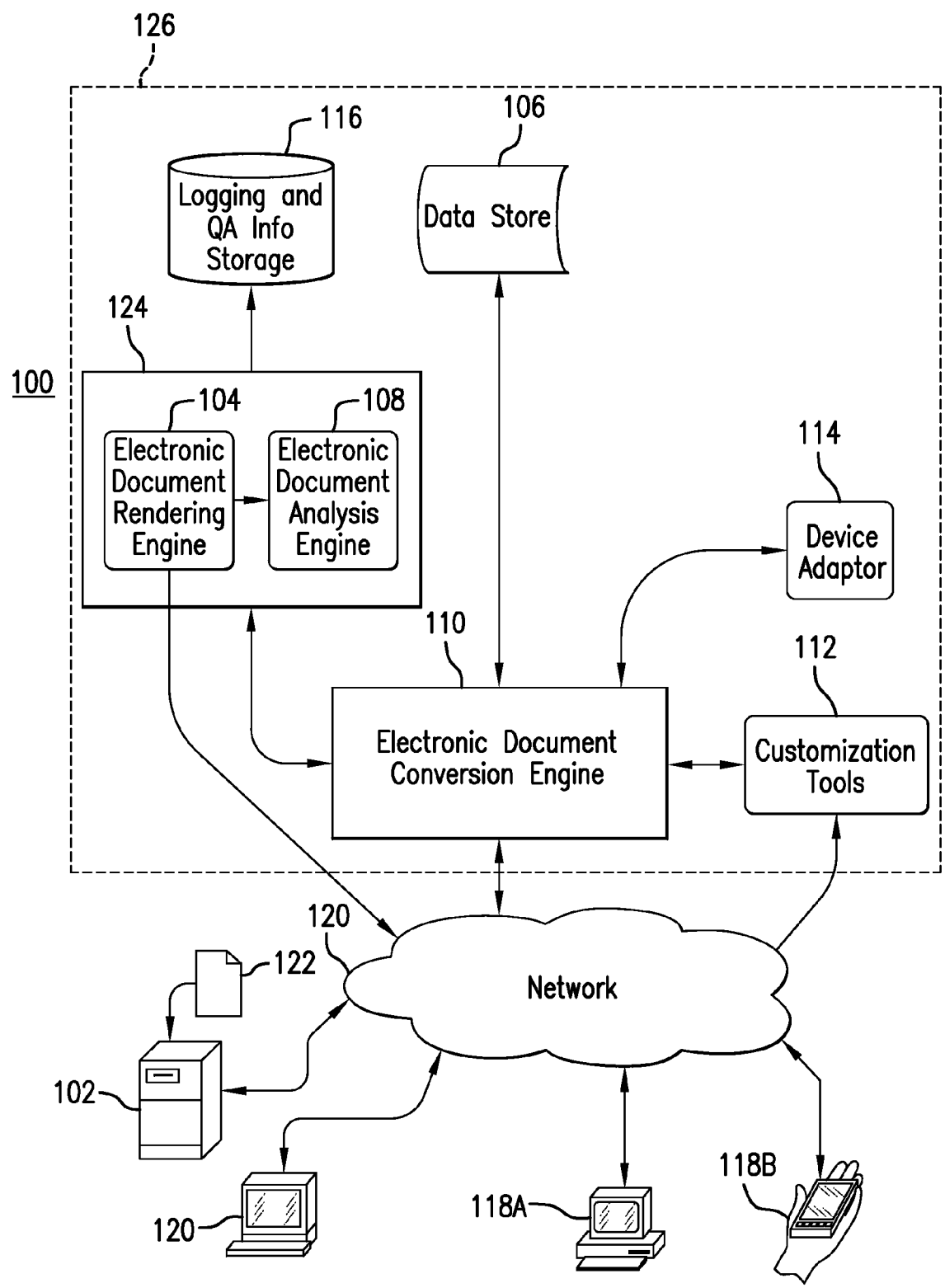
FIG. 1 is a block diagram of an exemplary embodiment of a system according to the present disclosure.

FIG. 1 shows a block diagram of one exemplary embodiment of a system 100 that can be configured to access network content. According to this exemplary embodiment of FIG. 1, the system 100 can comprise a plurality of end-user computing devices in the form of end-user machines 118A and 118B (collectively 118), a web site server 102 hosting a website 122 which serves electronic documents, and an optional client machine 120 that can be adapted or configured to convert electronic documents to make them more easily viewable and readable for end-user machines 118. For clarity purposes, and not to provide any limitations, according to one exemplary embodiment, only a single website 122 can be shown. However, in another exemplary embodiment a plurality of websites can be hosted on the web server 102. Moreover, electronic documents can be herein, but not in any way that limits their description or definition, referred to as web pages that are served by website 122.

In one exemplary embodiment, for a first user test request, client machine 120 can select an electronic document served by website 122, to be converted, and communicate with electronic document conversion engine 110 via network 120. In a typical embodiment, the network 120 includes the Internet. However various networks can be used including a local area network, a wide area network, a point-to-point dial-up connection, a cell phone network, etc.

In another exemplary embodiment, the end-user machine 118 can access the electronic document by placing a call to the electronic document conversion engine 110, where the electronic document conversion engine 110 can act as a way to access the document or a transcoded version of it. Examples of such a setup include network-proxies, a web page or other electronic document with a field to enter the location of the document, or an application on the end-user machine 118 that can modify the electronic document request accordingly. The electronic document conversion engine 110 can then identify the electronic document and finds the corresponding parent structure for conversion, such as the corresponding website or domain in the example of web pages. This electronic document or electronic document parent structure can then be selected for conversion.

In another exemplary embodiment, information can be provided to the electronic document conversion engine 110 via the network 120 when an electronic document can be requested by the end-user machine 118. Examples of this can include applications that display electronic documents and also send information on the documents to the electronic document conversion engine 110. Another example can be a script in the website 122 sending information that a page has been requested to the document conversion engine. The document conversion engine 110 can then locate the corresponding parent structure for conversion, such as the corresponding website 122 or domain in the example of web pages. This electronic document or electronic document parent structure can then be chosen for conversion.

In another exemplary embodiment of the present disclosure, a list of electronic documents, for which the electronic document parent structures are identified if needed, can be analyzed as described herein below, and the results stored in one or more data store 106.

In certain exemplary embodiments, the electronic document conversion engine 110 can be connected to a data store 106, which can have automatic parameters stored. The electronic document conversion engine 110 can communicate with an electronic document rendering engine 104, regarding the web pages of the website 122 to analyze, and the automatic parameters stored in data store 106. In a typical embodiment of the present disclosure the electronic document rendering engine 104 can receive the url of the page to analyze. In other exemplary embodiments, the electronic document rendering engine 104 can also receive the HyperText Markup Language (HTML) of the page to be analyzed, the logo and icons to identify, and any Cascading Style Sheets (CSS). It can also receive parameters regarding the maximum number of candidates for each functional block type that the electronic document analysis engine 108, defined below, can be looking for. In certain exemplary embodiments, the maximum number of candidates for each functional block type can be automatically set to one. In another exemplary embodiment, a screenshot can also be taken. The client machine 120 can alter the automatic parameters via customization tools 112.

The electronic document rendering engine 104 can retrieve the layout attributes of web pages served by website 122 from website server 102 via network 120. Other electronic documents, including electronic forms, can also be rendered by the electronic document rendering engine 104. The code that the electronic document rendering engine 104 retrieves can be HTML and/or CSS, but it can be other code. The electronic document rendering engine 104 can be any tool that can calculate display and layout attributes, including but not limited to web browsers, electronic document interpreters, or HTML+CSS parsers.

The electronic document rendering engine 104 can be coupled to the electronic document analysis engine 108 (together known as an automatic content identifier 124), which identifies logical block elements in the web pages with the help of the electronic document rendering engine 104, ranks the block elements, and sorts the elements according to their rank. In some embodiments, the automatic content identifier 124 can be a web service that runs on a web server, but it can be any type of server. In a typical embodiment, the electronic document analysis engine 108, can score the block elements, and ranks them according to score. The blocks with the highest score can be saved in the data store 106 in a format that allows for the ability to retrieve respective blocks in the web page HTML. The data store 106 can include a cloud-based storage service, a database, a local disk drive or any other method of storing data for later access in response to end-user machine 118 requests. The highest scored blocks saved in the data store 106 can be specified in the regions of interest. In another exemplary embodiment of the present disclosure, the electronic document analysis engine 108 also creates a style definition for each block and elements in each block. The resulting styling recipe complements the regions of interest. The electronic document analysis engine 108 can also be coupled with a logging and quality assurance (QA) info storage 116. The logging and QA info storage can serve as a repository for the analysis results produced by the automatic content identifier 124. The storage can allow for the retrieval of records of all the automatic content identifier 124 analyses in order to evaluate their accuracy. The evaluation process can be either manual (e.g., human operator), assisted (e.g., human operator with the support of evaluation tools), or fully automated. The outcome of such evaluations achieves a double purpose:

1) to pro-actively identify and correct potential analysis issues; and
2) to provide valuable data to further improve the accuracy of the identification strategy, for instance by producing additional data to be used to train the process used by the electronic document analysis engine 108.

The electronic document analysis engine 108 can be coupled with the electronic document conversion engine 110, which captures and extracts the content from the electronic document analysis engine 108, and parses it into objects. In a typical embodiment, the electronic document conversion engine 110 can rearrange HTML or other code for end-user machines 118. The other code can include scripts and styling tags. In one exemplary embodiment, the objects can be returned by the electronic document conversion engine in the order in which they were recognized by the automatic content identifier 124. In another exemplary embodiment, electronic document conversion engine 110 can identify and modify the links that make up the menu block, and puts them in association with each other. This can be done through the creation of a hierarchy, as described in the patent application US 2007/0130125, which is incorporated herein by reference in its entirety. In another exemplary embodiment, the links can be put into association with each other via changing link suffixes to incorporate server side logic that associate it with corresponding menu objects and components of the next electronic document. The electronic document conversion engine 110 can be coupled with customization tools 112, that the client machine 120 can access to customize the converted web pages. The electronic document conversion engine can also be coupled with the device adapter 114, which prepares and adapt the objects for targeted end-user machines 118. The device adapter 114 can adjust the electronic documents based on end user machine 118 capabilities such as its overall screen resolution, screen pixels per inch, style-interpretation, graphics and scripting capabilities. In typical embodiments, the device adapter can be any framework, including but not limited to Sencha Touch. Adjustment examples can include:

a) increase the font size for end user machines 118 with high overall screen resolution and screen pixels per inch greater than a regular computer screen, so that screen pixels per inch in relation to viewing distance of two end-user machines 118 shall approximately match;
b) use advanced style definitions, including but not limited to CSS3, in the context of HTML, if end-user machine 118 supports it. Otherwise, provide alternative style definition;

c) if end-user machines 118 support it, include particular graphics or functional elements with graphics, such as high color depth graphics or interactive visual content, such as animations, animated interaction, video players, maps and games. If the end-user machines 118 do not support them, exclude the elements; and d) include scripting if the end-user machine's 118 capabilities support it. Scripts, which can include JavaScript and <script> tags, can refer to scripts present in the original electronic document or inserted by the electronic document conversion engine 110 to achieve aforementioned or further usability improvements. If scripting may not be supported by the end-user machine 118, it shall not be included. The transcoded version of the electronic document without scripts shall be used. In an alternative embodiment of the present disclosure the electronic document conversion engine 110 can execute the script and transcodes the resulting version of the document.

End-user machines 118 can be coupled to the electronic document conversion engine 110 via the network 120. The End-user machines 118 can be large-screen devices (such as, e.g., desktops and laptops) 118A or small-screen devices (such as, e.g., personal digital assistants—"PDAs", and mobile phones) 118B. In one exemplary embodiment, the large-screen devices 118A and small-screen devices 118B can also access the customization tools 112.

Upon a request from an end-user machine 118, for a given web page served by website 122 via the network 120, the electronic document conversion engine 110 can retrieve information stored in data store 106 about the blocks identified and scored. The electronic document conversion engine 110 can use the blocks to transcode code (i.e. HTML) for display on end-user machines 118. In typical embodiments, this can be accomplished by converting the information stored in data store 106 into objects using PHP, although other programming languages can be used, including C++. The objects can be JSON objects, or any objects that can be interpreted by the device adapter 114. For the small-screen devices 118B, the electronic document conversion engine can also apply general styling for optimal viewing on the small-screen devices 118B. In one exemplary embodiment, a general styling sheet (e.g., that conforms to certain preferred practices) can be used by default. However, in another exemplary embodiment, client machine 120 can append the general styling sheet with additional styling. In certain exemplary embodiments, the electronic document conversion engine can also change all links and uniform resource locators (URLs) in the document to either refer to the original files or web pages or to represent the objects/regions of interest that have been retrieved from the electronic document analysis engine 108. The device adapter 118 can downsize certain images and transcoded documents, and further adjust the objects so that they can be optimally rendered and displayed on the target end-user machine 118.

In some exemplary embodiments, on first request for web page by end-user machine 118, the device adapter 114 can cause menu and component objects one level deep, including but not limited to widgets, content and map, to be cached by browser on end-user machine 118. In part, this decreases latency between the end-user machine 118 and the server 102. The objects can be stored in document object model ("DOM") and/or WebKit storage. Once in DOM, they can be retrieved on subsequent end-user machine 118 requests. Therefore, on subsequent requests from the end-user machine 118, for a given web page served by the website 122 via the network 120, some of the information one level deep can be fetched from end-user machine 118, instead of from the server 102.

In another exemplary embodiment, the exemplary electronic document conversion engine 110 can request the electronic document rendering engine 104 and electronic document analysis engine 108 every time without the use of a data store.

In certain exemplary embodiments of the present disclosure, the given web page that the end-user machine 118 requests does not have stored information in data store 106. If the stored information is not in data store 106, then the electronic document conversion engine 110 can tell the electronic document rendering engine 104, to retrieve the web page served by website 122 on server 102 to analyze. The electronic document rendering engine 104, the electronic document analysis engine 108, the electronic document conversion engine 110 and the device adapter 114 then can carry out the procedure described above.

In other exemplary embodiments of the present disclosure, the electronic document rendering engine 104 and the electronic document analysis engine 108 can be used stand-alone without the electronic document conversion engine 110 and the device adapter 114. For example, the regions of interest can be used in other contexts such as but not limited to: document search; selective rendering of a document preview image; or comparative statistics over a range of websites.

In typical embodiments, the automatic content identifier 124, the electronic document conversion engine 110, the device adapter 114, the customization tools 112 the data store 106 and the logging and QA info storage 116 can be, e.g., together or in part, implemented on a server and/or computing device 126. The server can comprise memory, input/output ports, external devices, a central processing unit (CPU), external devices/resources and one or more buses. The memory can comprise any known type of transmission media and/or data storage, including but not limited to, random access memory (RAM), a data object, a data cache, read-only memory (ROM) and the like. External devices can include, but are not limited to, speakers, a screen, a keyboard, a monitor and a mouse.

Figure 2:
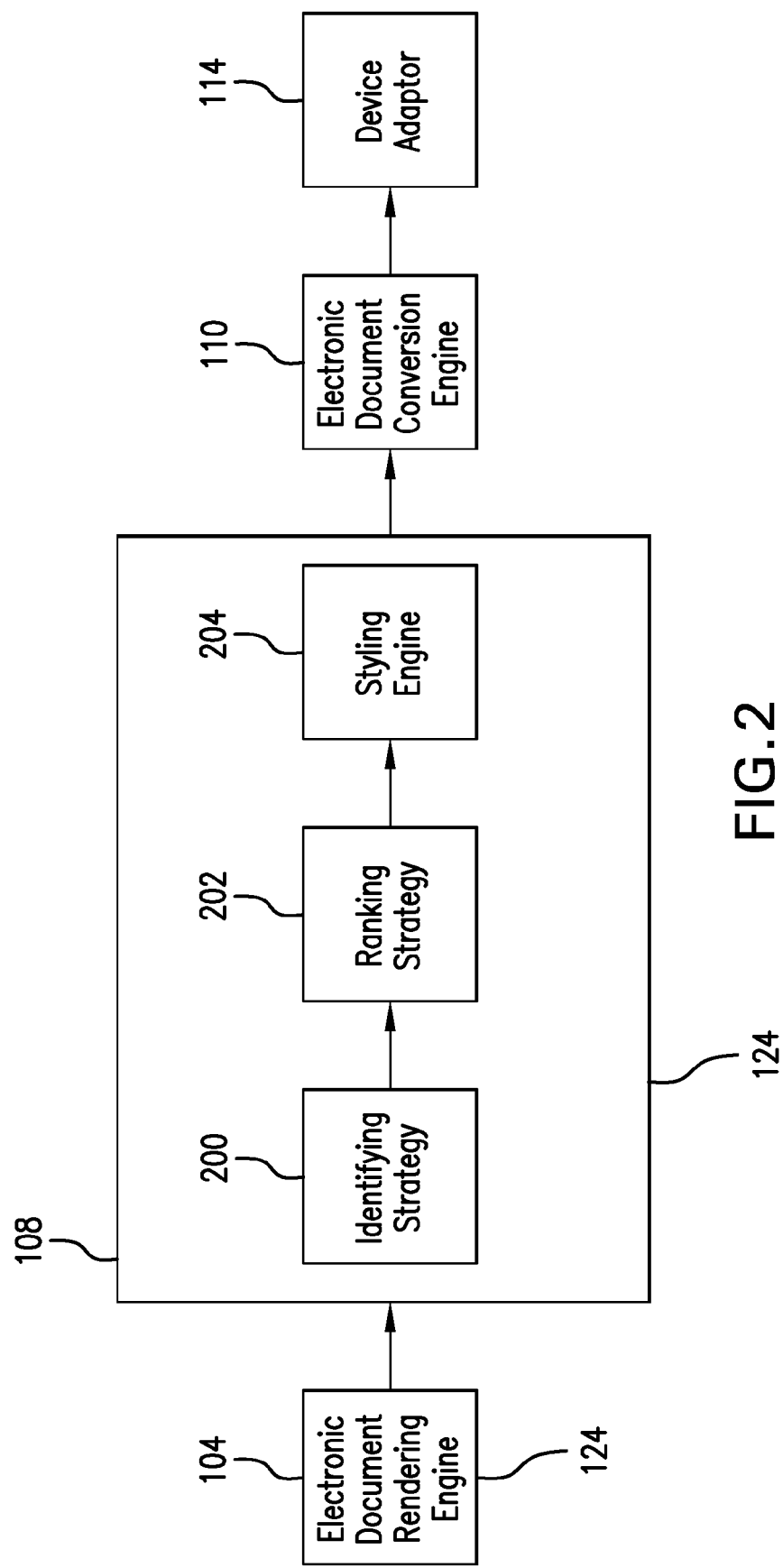
FIG. 2 is a schematic representation of an exemplary electronic document analysis engine illustrated in FIG. 1 and its exemplary components including the identifying strategy, the ranking strategy and the styling engine.

Referring to FIG. 2, a schematic block diagram shows an exemplary electronic document analysis engine 108 in greater detail. The exemplary structure shown in FIG. 2 is exemplary, and contemplates an engine that can be used for the system 100. In certain exemplary embodiments, one exemplary purpose of the electronic document analysis engine 108 can be to, using the layout attributes, automatically find and identify block elements. The block elements can be categorized per their function. For example, the electronic document analysis engine 108 can categorize blocks as content, menu, logo and/or color scheme blocks. The regions of interest, which assist in the transcoding and optimization of the web page, can be generated from these block elements. Separate regions of interest can be generated for each functional block type. In some exemplary embodiments, the electronic document analysis engine 108 can generate one or more potential regions of interest for each block type.

The electronic document analysis engine 108 can include an identifying strategy block 200, a ranking strategy block 202 and a styling engine 204. After the electronic document rendering engine 104 calculates the layout attributes of a web page, the identifying strategy block 200 can identify logical block elements using the layout attributes calculated by the electronic document rendering engine 104. In certain exemplary embodiments, the identifying strategy block 200 can divide the electronic document web page into individual blocks. In certain exemplary embodiments, this can be accomplished by using HTML tags such as "<div> </div>" or any other text based mark-up structure wrapping elements inside an open and a closing information, such as opening and closing tags.

In another exemplary embodiment of the present disclosure, blocks refer to elements in any binary file structure that identifies the beginning and end of data elements, The identified blocks' coordinates and size can be calculated following the layout and styling rules of the electronic document as defined in the corresponding electronic document format. The coordinates and size can be defined in the context of the display area of the entire electronic document. For the avoidance of doubt, the coordinates and size can refer to any shape, including but not limited to, rectangles, or circles, or can also refer to a composite shape, such as two rectangles or a rectangle and a circle.

In another exemplary embodiment, the identification strategy block 200 can further identify blocks by utilizing one or more search directions, which can be determined by the cultural, language and layout specific attributes of the analyzed document. For example, search directions can be based on the reading direction of the language, including, but not limited to left to right for English, right to left for Hebrew, and up-down for Chinese. The use of this additional identification step can be appropriate when: only a few blocks can be identified using the text-based mark-up structures or binary file structures (e.g. below the lower quartile of the average block count on the corresponding electronic document type); and/or the identified block's size can be too small (below the size expected for functional blocks); and/or the blocks can be positioned outside of the regular document display area; and/or the blocks can be positioned in a way that their order in the electronic document code does not correspond to their visual and reading order.

In typical embodiments of the present disclosure, where the identification strategy block 200 can utilize one or more search directions to identify blocks, the native blocks can be first identified using the initial identification logic for text-based or binary files. Native blocks can be blocks identified in the native format of the electronic document. For example, they can be the blocks identified by <div> tags. These native exemplary blocks can be logically combined into new blocks that may not be originally present in the native format of the electronic document. For example, in text-based electronic documents, such as HTML or XML based files, the new blocks can be identified by combining additional tags around certain text elements such as individual characters, words, sentences or word combinations separated by a linefeed intended for display.

Next, the coordinates and sizes for all of the identified blocks can be computed following the layout and styling rules of the electronic document as defined in the corresponding electronic document format.

In some exemplary embodiments, in order to identify additional blocks using the search directions, for each block identified, the next adjacent block can be identified using coordinates and size along a search direction, if such a block can be found within a set geometric distance between the first block's end coordinates in the specified search direction and the second block's beginning coordinates. For example, when searching top-down, the first block's bottom coordinates can be compared to the second block's top coordinates. For example, two blocks can be considered adjacent if they can be aligned along the reading direction, even if not perfectly aligned, within a certain tolerance. For example, the alignment of two blocks on a Cartesian plane can be evaluated considering the overlapping of the y coordinates, for horizontal alignment, or the x coordinates for vertical alignment, of the two blocks. Blocks that can be considered adjacent using this process can be aggregated into one logical block. In addition to the overlapping, other rules can be applied to determine if the two blocks can be adjacent, such as proportions of the geometric dimensions of the two blocks. These steps, which can be used to find eligible adjacent blocks to aggregate, can be repeated until there can be no further element within the distance.

All the adjacent blocks that can be found using, e.g., the search direction can be combined into logical blocks. The properties of the logical blocks can be determined based on the properties of the two or more blocks that can be part of it. For example, in order to determine the total inner text length of the logical block, the lengths of the inner text of each block can be computed together. In certain exemplary embodiments, the coordinates and size of the logical block can be computed by taking the minimum shape that contains the shapes of all the combined blocks. The minimum shape, can be, but is not limited to a rectangle. In other exemplary embodiments, shapes may not be aggregated into one resulting shape, but each logical block can be the union of the shapes of each element.

In another exemplary embodiment, a logical block can be the combination of native blocks only, while in other exemplary embodiments, it can be the combination of native blocks and other logical blocks.

In another exemplary embodiment, the aforementioned strategy for finding logical blocks can be executed multiple times. After each step, the newly found logical blocks can be added to the native blocks.

In one exemplary embodiment of the present disclosure, the aggregation into logical blocks can be executed considering multiple directions. For example, both left-to-right and top-to-bottom reading directions can be used if the electronic document does not aggregate any lines of text: left-to-right direction can be used to aggregate complete lines of text; top-down direction can be used to find small columns of text-flow; and then again left-to-right direction can be used to aggregate columns that belong together or individual table rows, such as navigation menu bars; and, finally, another top-to-bottom process can be used to aggregate all the rows together with the other identified blocks into major sections of the electronic document.

The identifying strategy block 200 can also exclude content that may not relevant. The blocks, identified utilizing the aforementioned methods described above, can serve as candidates for the location of functional areas of the web page. For example, the identifying strategy can categorize the blocks as candidates for being menu blocks (menu items and structure) and/or content blocks. In some exemplary embodiments, it can also identify logo blocks, color scheme blocks or other blocks. In one exemplary embodiment, the identifying strategy block 200 can search for the logo among the <img> in the page. If it finds a logo image, which can be ranked based on the image URL attributes, position, and/or size, and the image may not be a part of a map, it can download the image from the web page as it is. In another exemplary embodiment, if the logo can only be part of an image map, then the identifying strategy block 200 does not download the image. Instead, it can cut the area of the logo from the screenshot and saves it in data store 106. One or more fallback measures can also be used if the logo may not be found among the <img> tags. In one exemplary embodiment, the identifying strategy block 200 can search among the background images.

The identifying strategy block 200 can be coupled to a ranking strategy block 202, which can rank the candidate blocks based on their likelihood of being for certain functions. For example it can rank the candidate blocks according to their likelihood of being menu blocks and/or content blocks. In some exemplary embodiments, ranking strategy block 202, in order to rank the candidate blocks, can filter the block elements by size, by location and display properties, and/or by their content. For example, it can block elements by function based on whether the block elements contain text, images, or other content important for the display of the resulting web page or other electronic document. Any of the aforementioned filters can be optional, although, it can be preferable to utilize at least one filter. In certain exemplary embodiments, in order to rank the candidate blocks, the ranking strategy block 202 can compute a score for each of the block elements, and assign each block a number. For example, the ranking strategy block 202 can score the links on a page according to the probability that they can be menu items. However, in other exemplary embodiments, the ranking strategy block 202 can rank the block elements by function, without assigning them scores. For example, the ranking strategy block 202 can remove block elements not necessarily through filtering. The exemplary blocks can also be ranked based on their natural order.

In certain exemplary embodiments whereby the ranking strategy 202 computes scores, block elements can be subject to one or more scoring processes. During each single scoring process, elements can be evaluated based on scoring rules with the purpose of establishing whether they can be good candidates to perform a specific function inside the document (such as being relevant content rather than a navigational element or rather than a company logo) or among a group of documents. The score for each element can be based on the evaluation of at least one of these three factors:
1) the native code properties of the element. In the context of HTML pages, the properties would be the HTML tags and attributes, the proportion of linktext, the proportion of innertext of and the role of the element in the HTML hierarchy, and the like;
2) the visual layout of the element, including but not limited to geometrical properties such as shape, dimensions, area, and coordinates; and
3) the combination of native code properties and visual properties. For example, the link density in an HTML element can be evaluated as the number of links that the element contains—native code property—divided by the area that such element occupies—geometric property.

The artificial intelligence procedures of the ranking strategy block 202 responsible for scoring can be trained to recognize the relevant correlations among all the aforementioned factors, and use such findings to properly weigh the probability that a block element serves a particular function. In some exemplary embodiments, the ranking strategy block 202 can also adjust the scoring based on linear comparison, specifically by using a heatmap. For example, the ranking strategy block 202 can use a heatmap with regards to the block elements' size, location and/or innertext length. The ranking strategy block 202 can also categorize the block elements by adjusting the scoring based on input made during the exemplary AI Training Process. In some exemplary embodiments, the AI Training Process can comprise assembling a list of websites, manually picking the locations of the menu and content on the websites, and compiling data regarding the probability that specific portions of the web page contain the content or menu. The exemplary ranking strategy can automatically compare the results of this process with the preliminary results of the scoring process.

In a certain exemplary embodiment, menu blocks can be ranked by the following criteria. For the avoidance of doubt this shall be seen as an exemplary list to illustrate the scoring and ranking mechanism and not as a complete list:
 a. score geometric properties using the block's x and y axis position compared to the heatmap, the aspect ratio (width divided by height) and the size of the block. In a certain exemplary embodiment, a block with a high aspect ratio, e.g. 2 or above, at the top of an electronic document, can be a good indication of a menu block and can hence be assigned a high score;
 b. score links based on all the parent blocks that lead from the main body of the electronic document to the individual link. In a certain exemplary embodiment, the properties of the parent blocks that can be evaluated can include the type of the block, such as a <div> in HTML, and any reference to style and/or functionality, such as "class" or "Id" attributes and their values in HTML. In a certain exemplary embodiment, the weight of scoring these parent block properties can be determined by evaluating a large number of electronic documents of the relevant type, and finding statistically significant identifiers, such as the "class" attribute containing the word "menu" in the context of HTML;
 c. score the proportion of links in comparison to the block's size and text length in characters. The higher the count of links within the block, in comparison to the size of the block (width×height) or the text contained within the block, the higher the probability that the block can be a menu block. In another exemplary embodiment, the link text length in characters can be compared to the block's text length;
 d. score internal links, links that stay within the electronic document's parent structure, by number and in proportion to the total links found within the block;
 e. score the individual length in characters of the text within the links and the average of all these link text lengths within a block. If the individual length of a link text and/or the average link text length can be short, but greater than two, then the probability that the block can be the menu block can be high;
 f. score the text displayed within the links in the block if it contains specific words or groups of words that indicate that this block can be a menu, such as "home" or "contact us." The more links within the block that contain such words or groups of words, the higher the probability that the block can be the menu block;
 g. the more parent elements a block can have until the main body of the electronic document can be reached, the higher the probability that the block can be a menu block;
 h. if the block's definition, styling or identification properties can indicate that the role of the block can be the navigation menu, the score can be increased accordingly. Examples include: pre-defined block definitions or tag names, such as the "nav" tag, attributes or style references such as "Id" or "class" or "datarole" with their values containing the word "menu", "nav" or related expressions. The definition of the storage format of the electronic document can, in some cases, include references to aforementioned tags, block names, identifiers or style references, e.g., the HTML 5 definition for HTML documents. In another exemplary embodiment, the score of a block can also be decreased if a block's role can be indicated to be another function than the menu; and i. if the electronic document consists of several sub-documents, such as "frames" in the context of HTML webpages, the sub-document can have an identification that indicates the role in the page. The identifiers can contain text such as "nav" or "menu" and therefore the probability that the block can be the menu block can be higher.

In a certain exemplary embodiment, content blocks can be ranked by the following criteria. For the avoidance of doubt, this can be seen as an exemplary list to illustrate the scoring and ranking mechanism and not as a complete list:

a. score geometric properties using the blocks x and y axis position compared to the heatmap, the aspect ratio (width divided by height) and the size of the block. In a certain exemplary embodiment a block with a low aspect ratio, e.g. 1 or below, in the center of the document, can be a good indication of a content block and can hence be assigned a high score;

b. score the links per block size (width×height). The greater the block size in comparison to the number of links within the block, the higher the probability that the block can be the content block;

c. score the block by the proportion of link text as share of the total text within the block. The lower the proportion of link text the higher the probability for the block to be the content block;

d. score the block's scoring-size in comparison to the maximum scoring-size found among all the individual blocks within the electronic document. In a certain exemplary embodiment the scoring-size can be the block's height times two plus the block's width. In another exemplary embodiment the scoring-size can be the regular size (width×height);

e. in XML, XML-like or HTML based electronic document formats, score the block by the proportion of the displayed text within a block as share of the total text that defines the block within the stored electronic document. The higher the proportion of the displayed text, the higher the probability that the block can be the content block;

f. score the proportion of text within the block as a share of the longest text length in characters found among all the individual blocks in the electronic document. The higher the proportion, the higher the probability of the block being the content block. In another exemplary embodiment the amount of text belonging to links can be subtracted before calculating the score. In another exemplary embodiment, blocks with a very short text length (e.g. less than 150 characters) can be given a very low score;

g. score the text within the block as a proportion of the total text displayed by the electronic document. If the text in the block significantly exceeds the majority of the text in the document, e.g. 80% or above, the block can be scored low as the probability that the block contains only the content block of the electronic document can also be low;

h. if the block's definition, styling or identification properties can indicate that the role of the block can be the content, the score can be increased accordingly. Examples include pre-defined block definitions or tag names, such as the "section" tag, attributes or style references such as "Id" or "class" or "datarole" and their value containing the word "content", "main" or related expressions. The definition of the storage format of the electronic document can, in some cases, include references to aforementioned tags, block names, identifiers or style references, e.g. the HTML 5 definition for HTML documents. In another exemplary embodiment, the score of a block can also be decreased if a block's role can be indicated to be another function than the content;

i. if the electronic document consists of several sub-documents, such as "frames" in the context of HTML web pages, the sub-document can have an identification that indicates the role in the page. The identifiers can contain text such as "main" or "content" and therefore the probability that the block can be the content block can be higher;

j. if the block contains predominantly external links and can be in a publicly accessible electronic document, the probability of this block containing advertisement can be increased and hence the probability of this block being the content block can be lower; and k. if the block contains the menu block, the block can have a high probability of being too big to contain only the content. The probability of the block being the content block can thus be reduced.

For the avoidance of doubt, the exemplary sum of all individual probabilities of a block being the menu or the content block can be reflected in the score or the rank of a block in the list of possible content or possible menu blocks.

Once the block elements can be categorized according to their type and scored, the ranking strategy block 202 can choose one or more candidate block elements with the highest probability of being one or more certain functional types, including menu and content, and assign them as those functional types. The number of candidates that the electronic document analysis engine 108 looks for and saves can be saved in data store 106 as an automatic parameter. In an embodiment, the number of candidates can be automatically set to one per functional type, but the number can be changed via customization tools 112.

While assigning the candidate block elements as certain functional types, the ranking strategy block 202 can compare a block's computed score or rank for the respective function to the other blocks' score or rank. For each functional block category, the block ranking or scoring highest can be chosen as the functional block. In one exemplary embodiment, each block can only take one function. When this leads to a block being considered for two functions, the decision can be made on score, rank, a set order of functions, such as menu before content blocks, or a combination of these. In a different exemplary embodiment, a more elaborate scoring strategy, such as a strategy identifying blocks as menu or content, which is described below, can be used to define the function of a block considered for multiple functions. In another exemplary embodiment blocks can be classified for multiple functions. In another exemplary embodiment, multiple blocks for each function can be facilitated.

For clarity purposes, the following example only assumes that two functional block types were scored, menu and content, but there could be more. In a certain exemplary embodiment involving only the scoring of menu and content blocks, the ranking strategy 202 can choose only the block element with the highest probability of being the real menu, and assigns it as the menu. Then the ranking strategy 202 can choose the block element with the highest probability of being the real content, and assigns it as the content. If the block element with the highest probability of being the real menu also can have the highest probability of being the real content, then the ranking strategy block 202 can choose the block element with the second highest probability of being real content to be the content.

Data store 106 can save the information on the highest scored menu (one or more) and the highest scored content (one or more), as well as all other automatically identified blocks in a format that allows to retrieve respective blocks in the website HTML, even if the respective HTML can have changed, like the regions of interest. The blocks identified as each functional type based on their score, can be picked as the corresponding regions of interest, including, but not limited to, the regions of interest for content and menu. In certain exemplary embodiments, these regions can be machine readable instructions that specify the locations of portions of the electronic document to be converted. The regions of interest can tell the electronic document conversion engine 110 what areas of the electronic document need to be converted and rendered.

In another exemplary embodiment, regions of interests corresponding to blocks can be identified for a binary file format. One or more exemplary regions of interest to locate the blocks within the binary file can be identified by finding a unique series of two or more bytes identifying the blocks, such as a block id stored as a series of bytes within in the file. In another exemplary embodiment, the starting point of a region of interest within the file can be defined by the number of bytes the first byte of the block can be offset against the first byte in the file. For the avoidance of doubt, exemplary bytes can be an exemplary unit for reading the binary file.

The exemplary ranking strategy procedure and/or block can also be coupled to a styling engine 204 that can create a style definition for each block and each element in the block. The style can be defined in the electronic document itself in accordance to the rules for styling in the respective document format, such as inline styling in an HTML document. Alternatively, external styling definitions referring to the document, if permitted by the document's styling logic, such as Cascading Style Sheets, can be used. Both of the styling definitions can be combined in accordance with the rules of the electronic document. The overall style can be for an end-user machine 118. In one exemplary embodiment, the styling engine 204 can ignore the old style of the original document. In another exemplary embodiment, the styling engine 204 can create a new style that utilizes references within the electronic document (such as headline or link identifiers). In another exemplary embodiment the styling engine 204 can recreate the visual style of the original electronic document. The styling engine 204 can determine background colors, text and anchor-text styling (color, font, weight, alignment), image styling, and margin and padding, all based on the original electronic document. For example, the styling engine 204 can determine background colors of the original website by sampling pixels. The styling engine 204 can also analyze the colors of the original website to determine if they would be readable on end-user machines 118. For example, the styling engine 204 can measure color distance and luminosity, and create a greater contrast, if needed.

In one exemplary embodiment, configuration data can be used to determine which blocks chosen by electronic document analysis engine 108 and stored in date store 106 can be shown to the end-user machine 118. This can be accomplished by either, automatically selecting the blocks using a filtering algorithm, manually selecting which blocks should be selected in a text or database editor or by manually selecting the blocks in a graphical user interface via customization tools 112.

Figure 3:
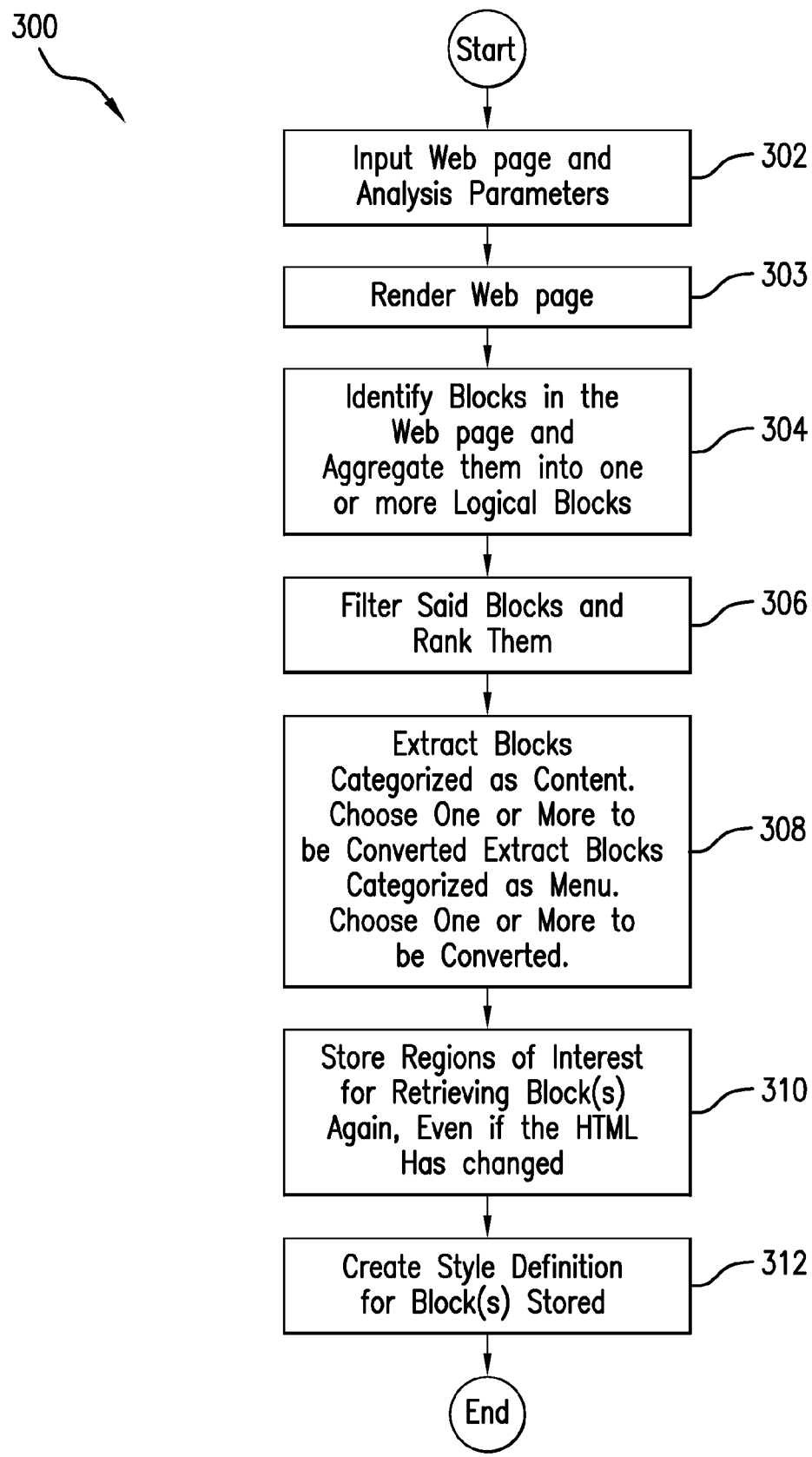
FIG. 3 is a flow diagram of an exemplary embodiment of an automatic rendering and analysis method according to the present disclosure.

Referring now to FIG. 3, a flow diagram of an exemplary embodiment of the present disclosure can be shown for a rendering and analysis method 300. For clarity purposes, the exemplary embodiment of the method shown in FIG. 3 can focus on block elements categorized as menu and content. However, in certain exemplary embodiments, the exemplary embodiment of the method can be used to identify and rank block elements for other functional types. Flow begins at block 302, where a web page can be inputted. For example, a web page can be inputted after a first user test request by the client machine 120. Next, in block 303, the web page's layout attributes can be analyzed by the electronic document rendering engine 104.

At block 304, blocks in the web page can be identified by the identifying strategy 200 of the electronic document analysis engine 108. For example, the identifying strategy 200 can go through the web page and divide the web page into native blocks using HTML tags or other text based mark-up structure wrapping elements inside an open and closing information. These native blocks can be logically combined into new blocks that may not be originally present in the native format of the electronic document. Additional blocks can be identified using one or more search directions, which can be determined by the cultural, language and layout specific attributes of the electronic document. Blocks that can be considered adjacent using this process can be aggregated into one or more logical blocks. The identifying strategy 200 can also exclude information that may not be relevant, and categorize blocks based on their functional type, including but not limited to menu blocks and/or content blocks.

Continuing in block 306, the logical blocks identified and aggregated can be ranked and filtered. For example, the ranking strategy 202 can go through the individual blocks and assign them numbers. The numbers represent the probability that the blocks can actually be of a certain functional type, for example menu or content. Next in block 308, the blocks with the highest scores for menu and content can be determined. For example, the blocks that can be categorized as content can be extracted, and one or more can be chosen to be converted. Further, blocks that can be categorized as content can be extracted, and one or more can be chosen to be converted. Alternatively, the ranking and scoring process described above can be used. The ranking strategy 202 can be responsible for choosing and extracting the blocks to be converted.

Continuing in block 310, the highest scored blocks can be stored for retrieval later using the regions of interest. For example, date store 112 can store the information. In one exemplary embodiment, only the blocks chosen as menu and content can be stored in data store 112. In another exemplary embodiment, more than one of the highest scoring blocks categorized as menu or content can be stored.

Next, in block 312, style definitions can be created for the blocks stored. For example, the styling engine 204 can create CSS definitions and determine background colors, text and anchor-text styling, image styling and margin and padding, all based on the original web page. As another example, the styling engine can infer the correct color of the original web page by sampling pixels.

Figure 4:
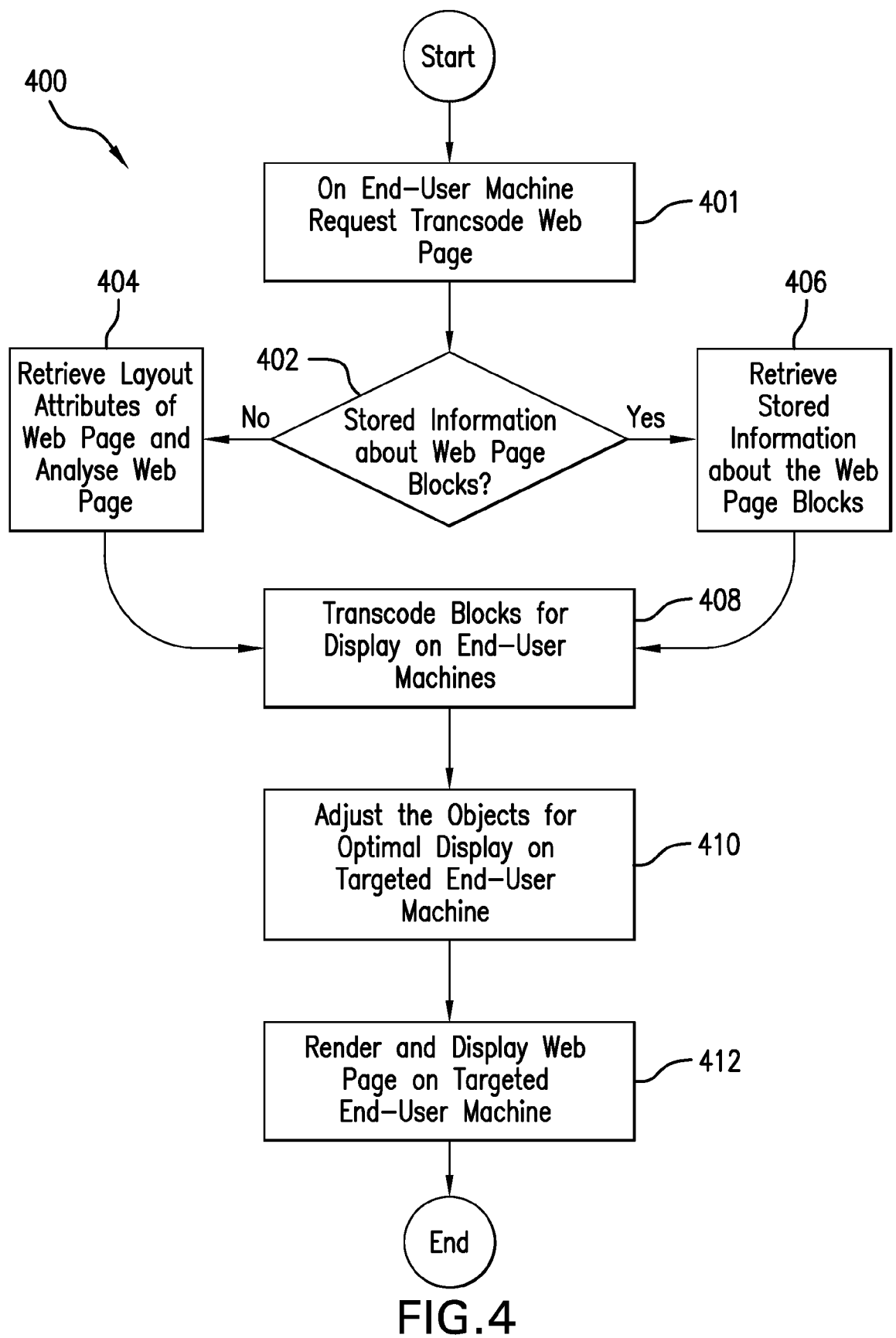
FIG. 4 is a flow diagram of an exemplary embodiment of a conversion and rendering method according to the present disclosure.

Referring now to FIG. 4, a flow diagram of an exemplary embodiment of the present disclosure can be shown for a conversion and rendering method 400. The exemplary flow begins at block 401, where, upon end-user machine 118 request, a web page can be transcoded. At block 402 it can be determined whether there can be stored information for blocks for the web page requested. If there is no information stored, then the rendering and analysis exemplary method can be carried out in block 404. If there can be information stored, the stored information about the web page blocks can be retrieved. For example, the electronic document conversion engine 110 can retrieve the stored information about the web page blocks from the data store 106 using, for example, the regions of interest. Next, at block 408, the blocks retrieved can be transcoded for display on end-user machine 118. For example, the electronic document conversion engine 110 can convert the information stored in data store 106 into objects using PHP. The electronic document conversion engine 110 can also identify and modify the links that make up the menu block, and put them into relationship with each other. This can be done through the creation of a hierarchy. Continuing at block 410, the resulting objects can be adjusted to be optimally rendered and displayed on target end-user machine 118. Next, at block 412, the web page can be rendered and displayed on target end user machine 118.

In other exemplary embodiments of the present disclosure, the information used for transcoding can be stored for later use. In another exemplary embodiment of the present disclosure, the information used for transcoding can be retrieved from website 122 hosted on web site server 102, or any other location, instead of from data store 106.

Figure 5:
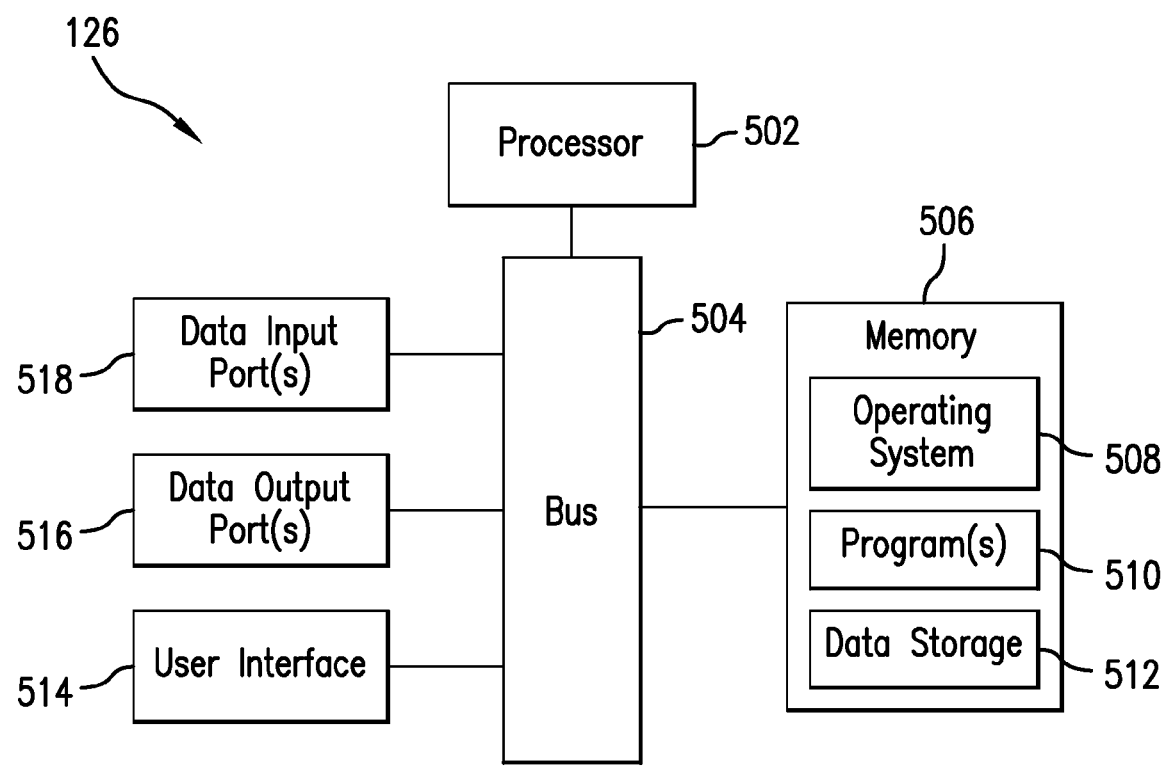
FIG. 5 is a block diagram of an exemplary computing device and its internal hardware on which the exemplary system can be implemented.

FIG. 5 shows one example of a computing device 500 on which the system according to an exemplary embodiment of the present disclosure can be implemented. Such exemplary computing device 500 can have a CPU, such as processor 502, a memory or storage arrangement 506, at least one data input port 518, at least one data output port 516, and a user interface 514, all interconnected by one or more buses 504. However, in other exemplary embodiments, where the computing device 500 can be a server, the data input port(s) 518, the data output port 516 and the user interface 514 do not have to be present. The memory storage arrangement 506 can store the operating system software 508, and other software programs including a program 510 for implementing the automatic content identifier 124, the electronic document conversion engine 110, the device adapter 114, and the customization tools 112. The memory/storage arrangement 506 can further include a data storage 512 for storing collected data sets through one of the input port 518 and/or for storing results generated during execution of the program 510. The data storage can comprise data store 106 and logging and QA info storage 116.

The program 510 can be organized into modules which can include coded instructions that when executed by the processor 502, can cause the computing device 500 to carry out different aspects, modules, or steps of the method for rendering, analyzing and/or converting an electronic document according to an exemplary embodiment. All or part of memory/storage arrangement 506, such as data storage 512, can reside in a different geographical location from that of processor 502 and be coupled to processor 502 through one or more computer networks.

The program 510 can also include a module including coded instructions, which, when executed by the processor 502, can cause the computing device 500 to provide graphical user interfaces ("GUI") for the user to interact with the computing device 500, and direct the flow of the program 510.

Figure 6A:
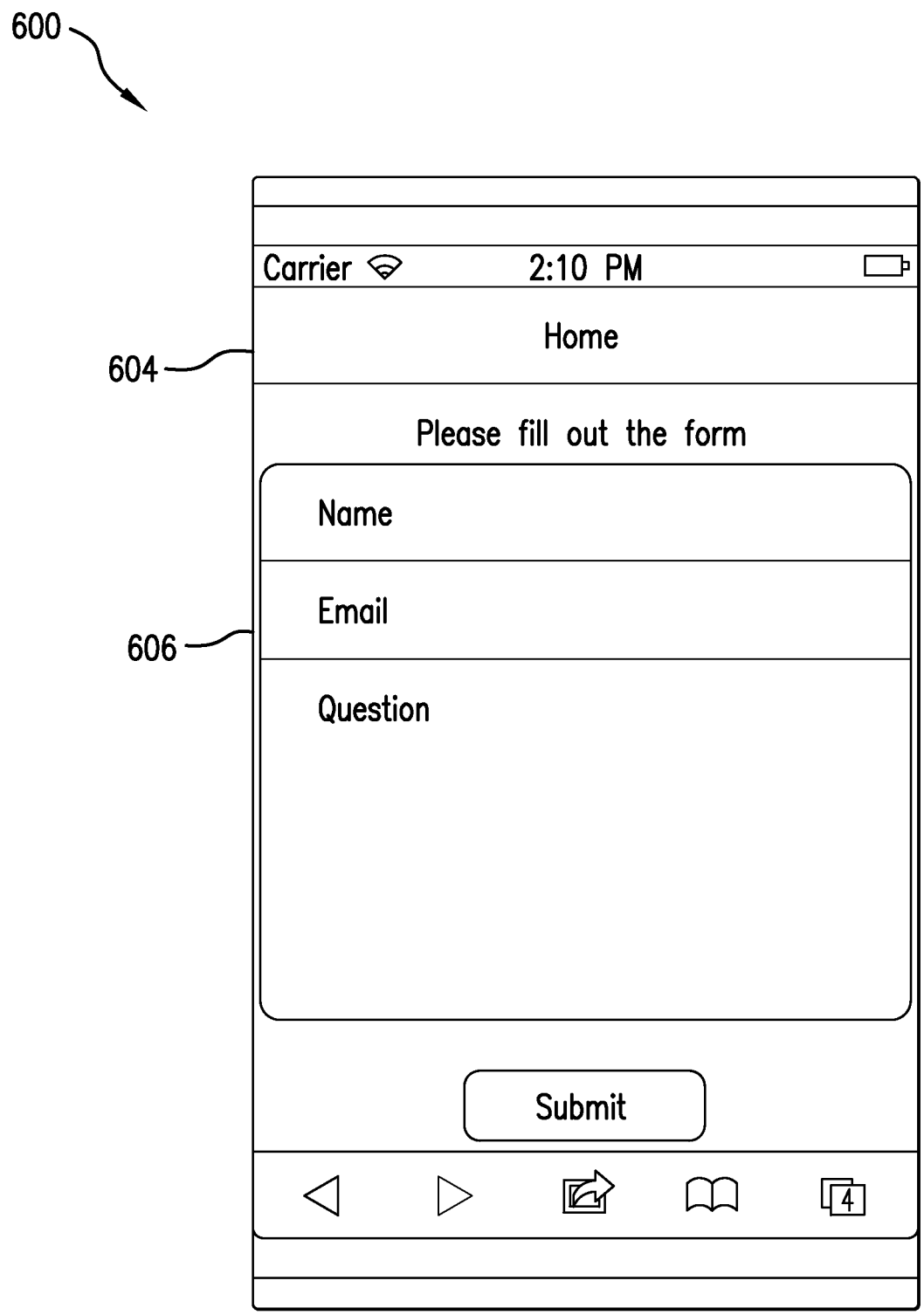
FIGS. 6A-6B are exemplary web pages rendered on a small-screen device that use the exemplary embodiment of an automatic rendering and analysis method, and which are generated by the exemplary embodiment of the system, software arrangement and computer-accessible medium according to the present disclosure.
Figure 6B:
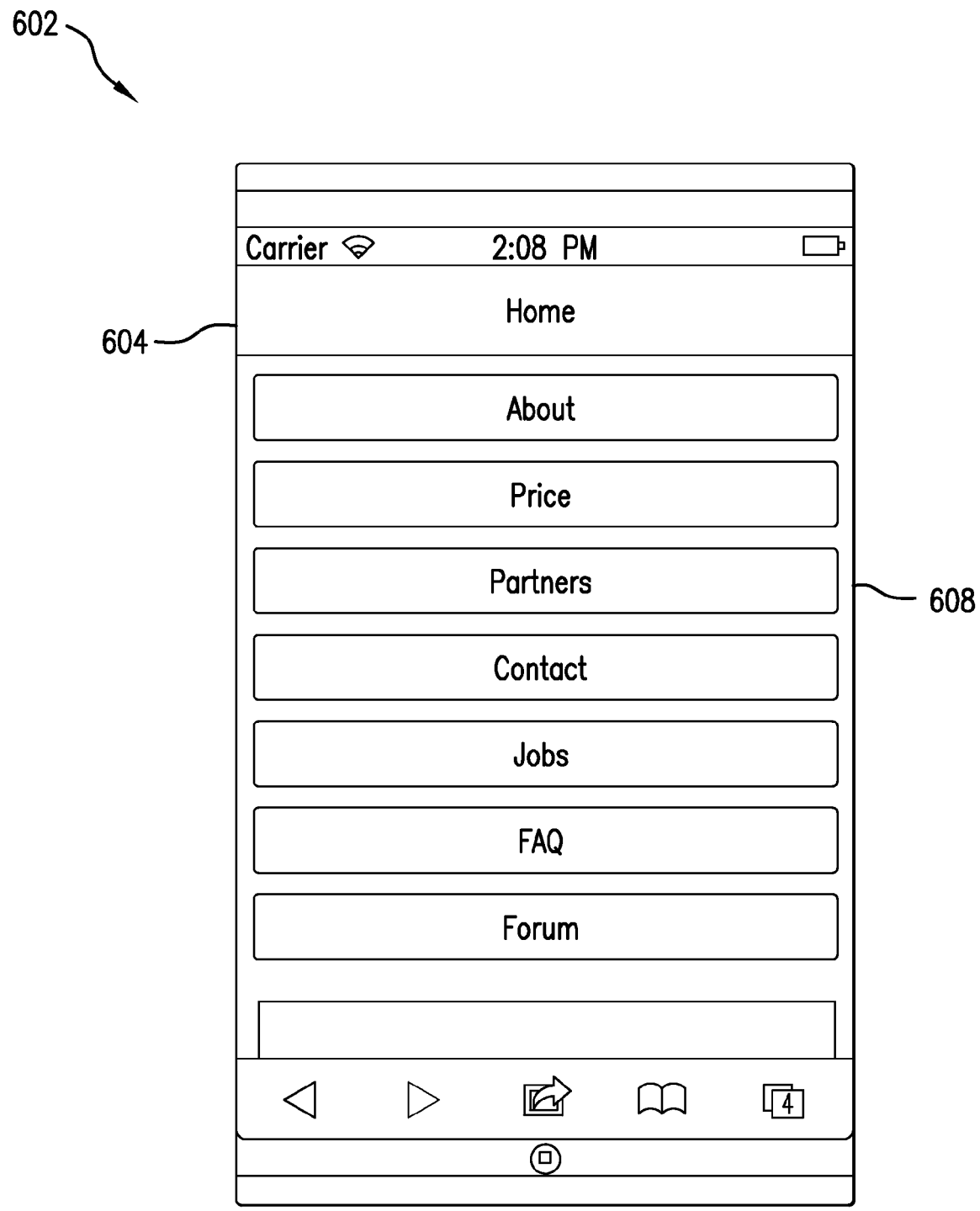

Referring now to FIG. 6A, a representative web page 600 is shown rendered on the small-screen device 118B using the automatic analysis method, system, software arrangement and computer-accessible medium according to the present disclosure. The exemplary web page 600 of FIG. 6A illustrates a header 604, and a question form 606. FIG. 6B illustrates another exemplary web page 602, also rendered on the small-screen device 118B using the automatic analysis method. The exemplary web page 602 shows a header 604, and a menu 608, which was selected from the menu block candidates during the analysis process.

Figure 7:
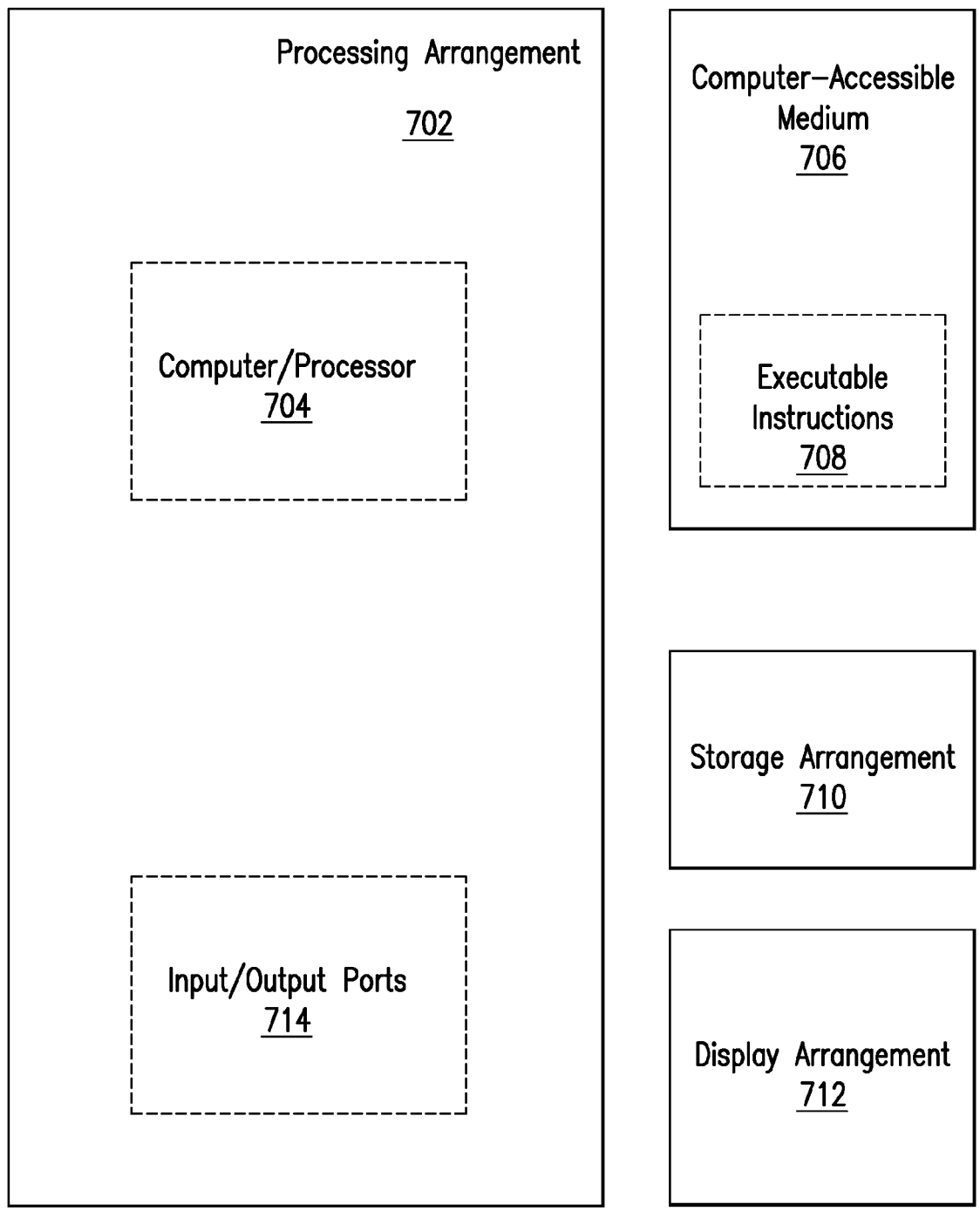
FIG. 7 is an illustration of an exemplary block diagram of an exemplary system in accordance with certain exemplary embodiments of the present disclosure Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the accompanying paragraphs.

FIG. 7 shows a block diagram of an exemplary embodiment of a system according to the present disclosure. For example, exemplary procedures in accordance with the present disclosure described herein can be performed by a processing arrangement and/or a computing arrangement 702. Such processing/computing arrangement 702 can be, e.g., entirely or a part of, or include, but not limited to, a computer/processor 704 that can include, e.g., one or more microprocessors, and use instructions stored on a computer-accessible medium (e.g., RAM, ROM, hard drive, or other storage device).

As shown in FIG. 7, e.g., a computer-accessible medium 706 (e.g., as described herein above, a storage device such as a hard disk, floppy disk, memory stick, CD-ROM, RAM, ROM, etc., or a collection thereof) can be provided (e.g., in communication with the processing arrangement 702). The computer-accessible medium 706 can contain executable instructions 708 thereon. In addition or alternatively, a storage arrangement 710 can be provided separately from the computer-accessible medium 706, which can provide the instructions to the processing arrangement 702 so as to configure the processing arrangement to execute certain exemplary procedures, processes and methods, as described herein above, for example.

Further, the exemplary processing arrangement 702 can be provided with or include an input/output arrangement 714, which can include, e.g., a wired network, a wireless network, the internet, an intranet, a data collection probe, a sensor, etc. As shown in FIG. 7, the exemplary processing arrangement 702 can be in communication with an exemplary display arrangement 712, which, according to certain exemplary embodiments of the present disclosure, can be a touch-screen configured for inputting information to the processing arrangement in addition to outputting information from the processing arrangement, for example. Further, the exemplary display 712 and/or a storage arrangement 710 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A non-transitory computer-accessible medium having stored thereon computer-executable instructions for analyzing at least one electronic document, wherein, when a computer hardware arrangement executes the instructions, the computer arrangement is configured to perform procedures comprising:
receiving content data related to the at least one electronic document;
segmenting the content data into a plurality of first segments;
combining at least two of the first segments into at least one second segment; and
generating ranking information for the at least one second segment,
wherein the ranking information is determined by the computer hardware arrangement using at least one computing score based on at least one rule for establishing whether the at least one second segment is a candidate for performing at least one function inside the at least one electronic document, and wherein the at least one computing score is based on an evaluation of at least one of native code properties of the first segments or at least one visual property of the first segments.

2. The non-transitory computer-accessible medium of claim 1, wherein the computer hardware arrangement is further configured to transcode the at least one second segment.

3. The non-transitory computer-accessible medium of claim 2, wherein the at least one second segment is transcoded based on the rank of the second segment.

4. The non-transitory computer-accessible medium of claim 1, wherein the at least one second segment includes a plurality of second segments, and wherein the computer hardware arrangement is further configured to generate the ranking information for the second segments.

5. The non-transitory computer-accessible medium of claim 4, wherein the computer hardware arrangement transcodes each of the second segments based on the rank information for each of the second segments.

6. The non-transitory computer-accessible medium of claim 1, wherein the computer hardware arrangement segments the content data based on predefined segments which are native to the content data of the at least one electronic document.

7. The non-transitory computer-accessible medium of claim 1, wherein the computer hardware arrangement is further configured to categorize each of the first segments.

8. The non-transitory computer-accessible medium of claim 7, wherein the computer hardware arrangement categorizes each of the first segments based on at least one predetermined function or at least one particular information associated with each of the first segments.

9. The non-transitory computer-accessible medium of claim 8, wherein the at least one particular information comprises at least one of content blocks or menu blocks.

10. The non-transitory computer-accessible medium of claim 1, wherein the computer hardware arrangement is further configured to generate at least one description of the at least one second segment.

11. The computer system according to claim 10, wherein the at least one description corresponds to at least one pattern-matching rule that identifies one or more block elements of the at least one electronic document.

12. The non-transitory computer-accessible medium of claim 1, wherein the at least one electronic document includes a web page.

13. The non-transitory computer-accessible medium of claim 12, wherein the web page is hosted on a server.

14. The non-transitory computer-accessible medium of claim 1, wherein the content data includes a HTML.

15. The non-transitory computer-accessible medium of claim 1, wherein the computer hardware arrangement segments the content data by dividing the at least on electronic document into the first segments based on at least one of mark-up structure wrapping elements inside an open and a closing information or elements in a binary file structure that identify a beginning and an end of at least one existing data element of the at least one electronic document.

16. The non-transitory computer-accessible medium of claim 1, wherein the computer hardware arrangement segments the content data by identifying adjacent ones of the first segments using at least one search direction, and combining at least one of the first segments with at least one adjacent one of the first segments.

17. The non-transitory computer-accessible medium of claim 16, wherein the at least one search direction is determined by at least one of (i) cultural specific attributes of the at least one electronic document, (ii) language specific attributes of the at least one electronic document, or (iii) layout specific attributes of the at least one electronic document.

18. The non-transitory computer-accessible medium of claim 1, wherein the computer hardware arrangement is further configured to adjust the at least one computing score based on at least one heat map associated with the at least one electronic document.

19. The non-transitory computer-accessible medium of claim 1, wherein the computer hardware arrangement is further configured to adjust the at least one computing score based on an artificial intelligence procedure.

20. The non-transitory computer-accessible medium of claim 1, wherein the computer hardware arrangement is further configured to generate at least one style definition for the at least one electronic document.

21. The non-transitory computer-accessible medium of claim 20, wherein the at least one style definition uses HTML compliant styling syntax.

22. The non-transitory computer-accessible medium of claim 2, wherein computer hardware arrangement is further configured to prepare and adapt the transcoded at least one second segment to be displayed on an end-user display device.

23. The non-transitory computer-accessible medium of claim 20, wherein the end-user display device is a mobile device.

24. The non-transitory computer-accessible medium of claim 1, wherein the at least one second segment is different than the first segments.

25. A system for analyzing at least one electronic document, comprising:
a computer hardware arrangement configured to:
receive content data related to the at least one electronic document;
segment the content data into a plurality of first segments;
combine at least two of the first segments into at least one second segment; and generate ranking information for the at least one second segment, wherein the ranking information is determined by the computer hardware arrangement using at least one computing score based on at least one rule for establishing whether the at least one second segment is a candidate for performing at least one function inside the at least one electronic document, and wherein the at least one computing score is based on an evaluation of at least one of native code properties of the first segments or at least one visual property of the first segments.

26. A method for analyzing at least one electronic document, comprising:

receiving content data related to the at least one electronic document;

segmenting the content data into a plurality of first segments;

combining at least two of the first segments into at least one second segment; and using a computer hardware arrangement, generating ranking information for the at least one second segment, wherein the ranking information is determined using at least one computing score based on at least one rule for establishing whether the at least one second segment is a candidate for performing at least one function inside the at least one electronic document, and wherein the at least one computing score is based on an evaluation of at least one of native code properties of the first segments or at least one visual property of the first segments.

* * * * *